(12) United States Patent
Lo

(10) Patent No.: US 7,570,767 B2
(45) Date of Patent: Aug. 4, 2009

(54) DECOUPLING ERROR CORRECTION FROM PRIVACY AMPLIFICATION IN QUANTUM KEY DISTRIBUTION

(75) Inventor: Hoi Kwong Lo, Toronto (CA)

(73) Assignee: MagiQ Technologies, Inc., New York, NY (US)

( * ) Notice: Subject to any disclaimer, the term of this patent is extended or adjusted under 35 U.S.C. 154(b) by 1184 days.

(21) Appl. No.: 10/492,101

(22) PCT Filed: Dec. 20, 2002

(86) PCT No.: PCT/US02/37619

§ 371 (c)(1),
(2), (4) Date: Apr. 8, 2004

(87) PCT Pub. No.: WO03/058865

PCT Pub. Date: Jul. 17, 2003

(65) Prior Publication Data

US 2004/0190719 A1    Sep. 30, 2004

Related U.S. Application Data

(60) Provisional application No. 60/341,807, filed on Dec. 21, 2001.

(51) Int. Cl.
*H04L 9/00* (2006.01)
(52) U.S. Cl. .................... 380/263; 380/256
(58) Field of Classification Search .................... 380/41, 380/255, 256, 263
See application file for complete search history.

(56) References Cited

U.S. PATENT DOCUMENTS

| | | | |
|---|---|---|---|
| 5,515,438 A * | 5/1996 | Bennett et al. ............. | 380/278 |
| 5,732,139 A * | 3/1998 | Lo et al. .................... | 380/28 |
| 5,764,765 A * | 6/1998 | Phoenix et al. ............. | 380/283 |
| 5,768,378 A * | 6/1998 | Townsend et al. ........... | 380/256 |
| 5,999,285 A * | 12/1999 | Brandt et al. .............. | 398/212 |
| 6,272,224 B1 * | 8/2001 | Mazourenko et al. ....... | 380/283 |
| 6,444,999 B1 * | 9/2002 | Tomita ....................... | 257/14 |
| 6,574,609 B1 * | 6/2003 | Downs et al. ............... | 705/50 |
| 6,895,091 B1 * | 5/2005 | Elliott et al. ............... | 380/278 |
| 6,931,128 B2 * | 8/2005 | Roberts ...................... | 380/44 |
| 7,006,633 B1 * | 2/2006 | Reece ......................... | 380/260 |
| 7,068,790 B1 * | 6/2006 | Elliott ........................ | 380/278 |
| 7,120,249 B2 * | 10/2006 | Roberts ...................... | 380/44 |
| 7,245,722 B2 * | 7/2007 | Hirota et al. ............... | 380/256 |

(Continued)

OTHER PUBLICATIONS

Hoi-Kwong Lo, A Simple Proof of the Unconditional Security of Quantum Key Distribution, May, 1999, HP Laboratories Bristol.*

(Continued)

*Primary Examiner*—David Garcia Cervetti
(74) *Attorney, Agent, or Firm*—Opticus IP Law PLLC

(57) ABSTRACT

An apparatus (1) and method for decoupling error correction from privacy amplification in a quantum key distribution (QKD 100) system includes two or more computer systems (102, 108) linked by quantum and classical channels (120, 122) where each computer system determines a generalized error syndrome associated with quantum communication between the systems, encrypts the generalized error syndrome using a sequence of values, and communicates the encrypted generalized error syndrome via a classical channel (128) to the other system, which uses the encrypted generalized error syndromes to compute error correction for the quantum transmission.

33 Claims, 10 Drawing Sheets

U.S. PATENT DOCUMENTS

| | | | |
|---|---|---|---|
| 7,266,304 B2* | 9/2007 | Duraffourg et al. | 398/151 |
| 2002/0030186 A1* | 3/2002 | Tomita | 257/14 |
| 2004/0086280 A1* | 5/2004 | Duraffourg et al. | 398/186 |

OTHER PUBLICATIONS

Bennett et al, "Experimental Quantum Cryptography," Eurocrypt '90, LNCS473, pp. 253-25 (1991).

Lutkenhaüs, "Security against individual attacks for realistic quantum key distribution" arxiv.quant-ph/9910093 v1 Oct. 22, 1999.

Cleve et al., "How to share a quantum secret," ArXiv:quant-ph/9901025 v1, Jan. 12, 1999.

Lo et al., "Is quantum bit commitment really possible?", ArXiv: quant-ph/96-3004v2 Apr. 2, 1997.

Lo et al., "Concentrating entanglement by Local Actions—beyond mean values," ArXiv:quant-ph/9707038 v2 Jul. 8, 1999.

* cited by examiner

DECOUPLING ERROR CORRECTION FROM PRIVACY AMPLIFICATION IN QUANTUM KEY DISTRIBUTION

CROSS-REFERENCE TO RELATED APPLICATIONS

This application claims priority under 35 USC 119(e) to U.S. provisional application 60/341,807, filed Dec. 21, 2001, entitled "Method for Decoupling Error Correction from Privacy Amplification." The teachings of that application are incorporated herein by reference.

BACKGROUND OF THE INVENTION

1. Field of the Invention

The invention relates to Quantum Key Distribution.

2. Discussion of the Background

The first quantum key distribution (QKD) protocol was published by Charles Bennett and Gilles Brassard in 1984 and is now known as "BB84." In 1992 Bennett published a "minimal" QKD scheme ("B92") and proposed that it could be implemented using single-photon interference with photons propagating for long distances over optical fibers.

U.S. Pat. No. 5,307,410 to Bennett discloses a system for transmitting a cryptographic key information between two entities. The teachings of that patent are incorporated herein by reference.

U.S. Pat. No. 6,188,768 to Bethune et al. discloses another system for transmitting a cryptographic key information between two entities. The teachings of that patent are incorporated herein by reference.

F. J. MacWilliams and N. J. A. Sloane, "The Theory of Error-correcting codes," North-Holland, 1977, and D. Gottesman's Ph.D. thesis, pp. 8-10, available at the Cornell University Library's ArXiv website in the section "quantum physics" as publication number 9705052, discuss classical and quantum coding theory. The teachings of these publications are incorporated herein by reference.

A qubit is a mathematical representation of the wave function of a two level quantum mechanical system.

A Quantum Key (QK) is a series of digital values (or more generally a series of values in an arbitrary base) derived from transmission of information in a Quantum Key Distribution (QKD) system.

QKD means the transmission of information from a sender to a receiver via a signal strength low enough so that quantum mechanical effects are significant wherein the information encodes a QK. In particular, QKD refers to the transmission of information in which a statistical error rate in reception of a series of transmitting datum is necessarily significantly affected by any measurement of the transmission between the sender and the receiver.

A QKD system is a system providing the means for performing QKD.

An autocompensating QKD system means a system in which two pulses are used to null out effects of the transmission medium on properties of the pulse in which information is encoded. Bethune et al. column 4 lines 25 to 35 disclose an autocompensating QKD system.

Reference herein to numbers of photons per pulse means the average number of photons per pulse unless context indicates otherwise, such as by the use of the word actual to characterize a pulse.

A single photon pulse as used herein has the same meaning ascribed to it at Bethune et al. column 5 line 61 to column 6 line 5, which pulses that each contain no more than one, and on average significantly less than one photon present in each pulse.

A multi photon pulse as used herein means the average number of photons in a set of pulses, in which each actual pulse may contain more than one photon, and in which set there are a significant fraction of the actual pulses containing no more than one photon. In this context, the significant portion means enough pulses containing no more than one photon to ensure that a resulting QK is secure. Thus, the significant portion at the receiver may be for example any one of 1, 10, 20, 30, 40, 50, 60, 70, 80, or 90 percent, depending upon the algorithm used to remove errors from the final QK, the error rate, and the number of qubits of information actually transmitted from the sender.

QKD systems may result in two parties using the system having similar but not identical sets of key values, such as digital values, or sets if bits, for each of their QKs.

Error as used herein refers to those bits for which the QK of the two parties have different values.

Here, by generalized error syndrome, we mean some general information about a quantum key. In other words, an error syndrome is generated by some prescribed logical operations on a quantum key. An example of an error syndrome is the standard error syndrome in classical and quantum coding theory. See, for example, MacWilliams and Sloane, p. 16 and Gottesman, p. 8. It gives the symptom of errors in a transmission or storage of information. For a linear code, any of its codewords, x, must satisfy an equation $Hx=0$, where H is called a parity check matrix and $Hx$ denotes matrix multiplication. Now, suppose x is transmitted, but the receiver obtains y. Then, the receiver can compute the error syndrome $s=Hy$, by applying the parity check matrix H on the vector y. The Cascade protocol by Brassard et al provides another example of error syndrome. In Cascade, an error syndrome is some parity bit of a key.

Computer as used herein includes any digital or analog computational device implemented using electronic, optical, or quantum signals or logic devices.

The present inventor recognized that security can be guaranteed by using the novel procedures for QK error detection, correction, and privacy amplification disclosed herein.

SUMMARY OF THE INVENTION

It is an object of the invention to provide a method of classical post-processing of data generated by QKD in such a way that it can be made secure against even the most general eavesdropping attacks.

It is a further object of the invention to provide competitive quantum key generation rates implemented with limited computational power.

These and other objects of the invention are provided by systems and methods for transmitting information in a 2 dimensional quantum system between two parties, each party interpreting the information as qubits in a mathematical representation of that system, and systems and methods for each party to determine from that information the same QK.

The invention advantageously provides a novel method of error correction involving one-way classical communication and two-way classical communication.

In one aspect, the invention comprises a system and method for QKD, comprising a first computer system; a second computer system; and a communications link linking said first computer system and said second computer system, wherein said first computer system is structured (a) to determine a first generalized error syndrome of a quantum transmission between said first computer system and said second computer system, (b) to encrypt said first generalized error syndrome using a sequence of values to form a first encrypted generalized error syndrome, and (c) to communicate said first encrypted generalized error syndrome to said second computer system.

In another aspect, the invention comprises a system and method for QKD, comprising determining by a first computer system a first generalized error syndrome of a quantum transmission between said first computer system and a second computer system; encrypting by said first computer system said first generalized error syndrome using a sequence of values to form a first encrypted generalized error syndrome; and communicating from said first computer system said first encrypted generalized error syndrome to said second computer system.

In another aspect, the invention comprises a system and method for QKD, comprising determining by a first computer system a first generalized error syndrome of a quantum transmission between said first computer system and a second computer system; encrypting by said first computer system said first generalized error syndrome using a sequence of values to form a first encrypted generalized error syndrome; communicating from said first computer system said first encrypted generalized error syndrome to said second computer system; receiving from said second computer system by said first computer system a second encrypted generalized error syndrome of said quantum transmission; and computing a relative value from said first encrypted generalized error syndrome and said second encrypted generalized error syndrome.

BRIEF DESCRIPTION OF THE DRAWINGS

The invention is described in connection with the following figures, wherein like reference numerals designate identical or corresponding parts.

DETAILED DESCRIPTION OF THE PREFERRED EMBODIMENTS

Figure 1:
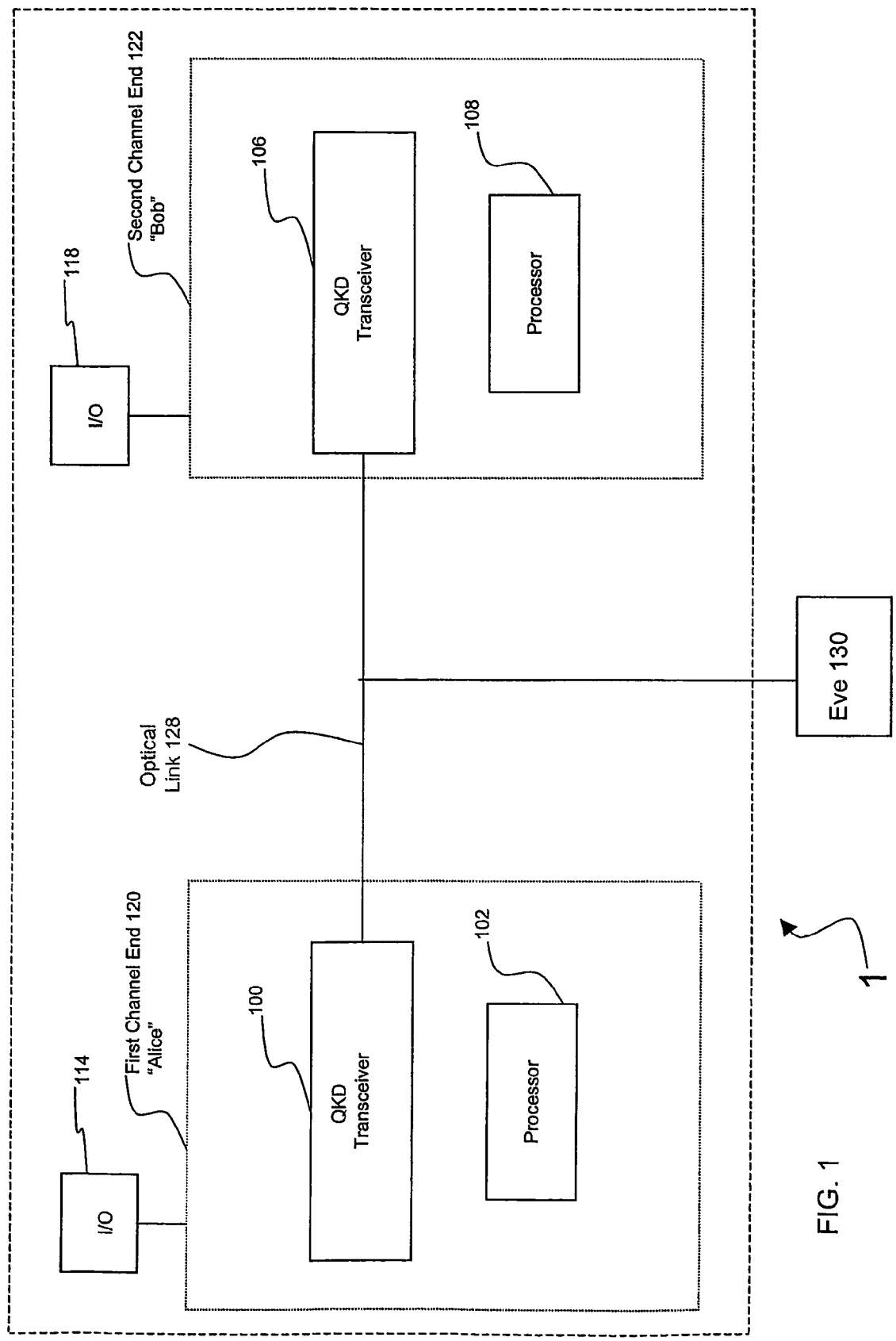
FIG. 1 is a high level block diagram illustrating a quantum key distribution (QKD) system 1 of the invention.

FIG. 1 shows a high level block diagram illustrating QKD system 1. QKD system 1 includes first channel end 120, optical link 128, and second channel end 122.

A first user, designated "Alice" hereinafter, uses first channel end 120. A second user, designated "Bob" hereinafter, uses second channel end 122. It is conventional to refer to sender and receiver in QKD as "Alice" and "Bob," respectively, and to a potential eavesdropper as "Eve," as shown in FIG. 1.

First channel end 120 includes QKD transceiver 100 and processor 102. QKD transceiver 100 functions to transmit and receive light pulses comprising quantum key data. Processor 102 functions to process quantum key data.

Optical link 128 optically connects to first channel end 120 and second channel end 122. Optical link 128 provides a path for optical signals transmitted between first channel end 120 and second channel end 122. Optical link 128 may be, for example, an optical fiber or a free space link.

First channel end 120 functions to phase modulate and transmit single photon pulses to second channel end 122 via the optical link 128.

Second channel end 122 functions to measure the single photon pulses received from the optical link 128.

In high level operation, first channel end 120 phase modulates and sends a sequence of light pulses to second channel end 122 over optical link 128. Second channel end 122 observes single photons in the received light pulses and determines the transmitted quantum key using, for example, the BB84 protocol.

Optionally, there exists I/O 114 in communication with first channel end 120 to transmit data signals into first channel end 120 and to receive data signals from first channel end 120. I/O 114 may comprise an input output device, such as a keyboard, mouse, voice recognition device. I/O 114 may comprise a digital computer including a digital CPU, memory, operating system, and digital computer algorithms for instructing and receiving data from first channel end 114. The digital computer algorithm devices of the present invention may be any interpreted or executable code mechanism, including but not limited to scripts, interpreters, dynamic link libraries, Java classes, and complete executable programs, in both software and hardware implementations. Moreover, parts of the digital processing of the present invention may be distributed for better performance, reliability, and/or cost.

Software for classical post-processing of QKD can be found, for example, at http://www.cki.au.dk/.

I/O 116 is also optional, and it is in communication with second channel end 122. I/O 116 performs the same functions as I/O 116. I/O 116 has substantially the same structure and functional capability as I/O 114.

An alternative embodiment of FIG. 1 is a so-called "plug and play" set up. Examples of such a plug and play set up can be found in, for example, Gisin et al, PCT Patent Application 60/025,839 and Bethune et al, U.S. Pat. No. 6,188,768. In those above patents, first channel end 120 functions to send a sequence of light pulses to second channel end 122, receive light pulses from second channel end 122, and decode quantum key information encoded in the light pulses received from second channel end 122. Also, second channel end 122 functions to phase modulate and attenuate light pulses received from optical link 128, and transmit as single photon pulses the phase modulated light pulses back to optical link 128. In high-level operation, first channel end 120 sends a sequence of light pulses to second channel end 122 over optical link 128. Second channel end 122 modulates the received light pulses with user supplied quantum key information. Second channel end 122 then attenuates the light pulses to single photon light pulses and sends the attenuated, modulated light pulses over optical link 128 to first channel 120. A user at first channel end 120 observes single photons in the received light pulses and determines the transmitted quantum key using, for example, the BB84 protocol. The FIG. 1 embodiment may also be implemented using either a pair of correlated photons or the polarization of light pulses. See, for example, Franson, U.S. Pat. No. 5,243,649.

Quantum key distribution is discussed in Gisin et al, "Quantum Cryptography," published on Sep. 18, 2001, on the Cornell University Library's ArXive website under the section "quantum physics" as publication no. 0101098, Townsend, "Quantum cryptography on optical fiber networks" as published in Optical Fiber Technology (1998), Gottesman et al, "From Quantum Cheating to Quantum Security" Physics Today Online, November 2000. Some recent experiments on QKD have been done in, for example, Stucki et al, "Quantum Key Distribution over 67 km with a plug and play system," New Journal of Physics (4), 2002, 41.1-41.8.

Figure 2:
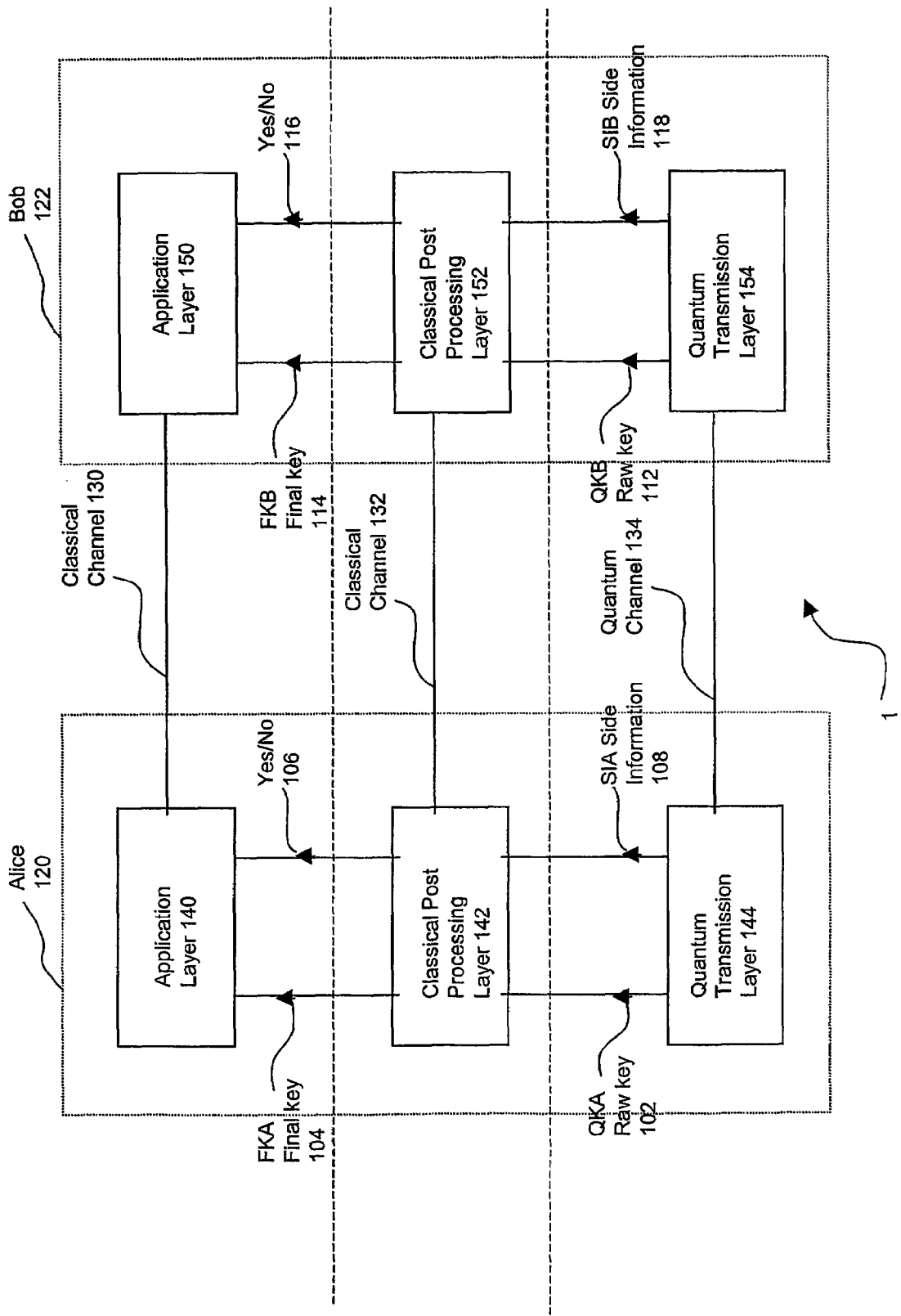
FIG. 2 is a high level block diagram illustrating a quantum key distribution (QKD) system 1 of the invention.

FIG. 2 shows a schematic description of quantum key distribution (QKD) system 1 comprising three sets of layers: Quantum Transmission Layers 144, 154, Classical Post-Processing Layers 142, 152, and Application Layers 140, 150.

A layer implements a set of algorithms to process inputs into outputs. In embodiments of the invention, a layer may may be implemented, for example, with software executed by one or more electronic, optical, or quantum computers, or, for example, with digital or analog electronic, optical, or quantum logic circuits. Embodiments of the invention may be implemented, for example, using distributed systems of secure computers linked by secure communication links.

First channel end 120 comprises Quantum Transmission Layer 144, Classical Post-Processing Layer 142, and Application Layer 140. Second channel end 122 comprises Quantum Transmission Layer 154, Classical Post-Processing Layer 152, and Application Layer 150. Quantum channel 134 links Quantum Transmission Layers 144, 154. Classical channels 130, 132 link Classical Post-Processing Layers 142, 152 and Application Layers 140, 150, respectively.

Quantum channel 134 is a communication channel using, for example, single photon light signals. Classical channels 130, 132 are classical communication channels using, for example, multi-photon light signals, Ethernet, Internet, or wireless channels. Each classical channel 130, 132 may be implemented using a plurality of physical channels. Quantum channel 134 and classical channels 130, 132 may share the same physical link, for example, optical link 128. This may be done, for example, by wave division multiplexing (WDM) or by time division multiplexing in optical fiber communications.

In channel end 120, raw key QKA 102 and SIA side information 108 are outputs from quantum transmission layer 144 and inputs to classical post processing layer 142. Final key FKA 104 and Yes/No signal 106 are outputs from classical post processing layer 142 and inputs to application layer 140.

Similarly, in channel end 122, raw key QKB 112 and SIB side information 118 are outputs from quantum transmission layer 154 and inputs to classical post processing layer 152. Final key FKB 114 and Yes/No signal 116 are outputs from classical post processing layer 152 and inputs to application layer 150.

In the operation of the FIG. 2 embodiment, Alice and Bob share quantum channel 134 for transmission of quantum data. First channel end 120 user Alice sends quantum signals (e.g., in the Bennett and Brassard scheme (BB84), a time-sequence of single photon pulses in one of four polarizations, vertical, horizontal, 45-degrees, 135-degrees) to second channel end 122 user Bob. Bob measures each quantum signal in one of the plurality of measurement bases (e.g., in BB84, rectilinear or diagonal bases) and records his measurement outcomes and bases.

Bob publicly acknowledges his receipt of quantum signals. Afterwards, Alice and Bob communicate their bases, but not the specific quantum state (e.g., the polarizations of the photons).

In BB84, Alice and Bob throw away the polarization data whenever they are using different bases. They keep the data where they are using the same basis. Those polarization data are called their raw keys, QKA 102 and QKB 112, respectively.

Alice also keeps side information SIA 108, comprising, for example, the polarization basis and the intensity of each quantum signal used for the transmission. Bob keeps similar side information SIB 118.

In Classical Post Processing Layer 142, Alice's inputs are QKA 102 and SIA 108 from her quantum transmission layer 144. Similarly, Bob's inputs are QKB 112 and SIB 118 from his quantum transmission layer 154. Alice and Bob share a classical communication channel 132. The goal is for them to communicate with each other using the classical communication channel 132 to distill out a more secure key. The output of their discussion (which may involve either one-way or two-way classical communications) comprises two parts. The first part is a one-bit yes/no answer 106, 116 to the question whether the final key generation has been successful. The second part is a final key FKA 104 in Alice's side and a final key FKB 114 in Bob's side. Ideally, with high probability, either the yes/no answer is a "no" answer, or FKA 104 is identical to FKB 114 and an eavesdropper has a negligible amount of information on the final key 104, 114. In the absence of an eavesdropper, the protocol should almost always give yes as an answer and generate a secure key.

In the Application Layer 140, 150, FKA 104 and FKB 114 are used for cryptographic purposes such as encryption or authentication. An example method of encryption is the one-time-pad method. Alternatively, standard encryption schemes such as Advanced Encryption Standard (AES) can be used.

Figure 3:
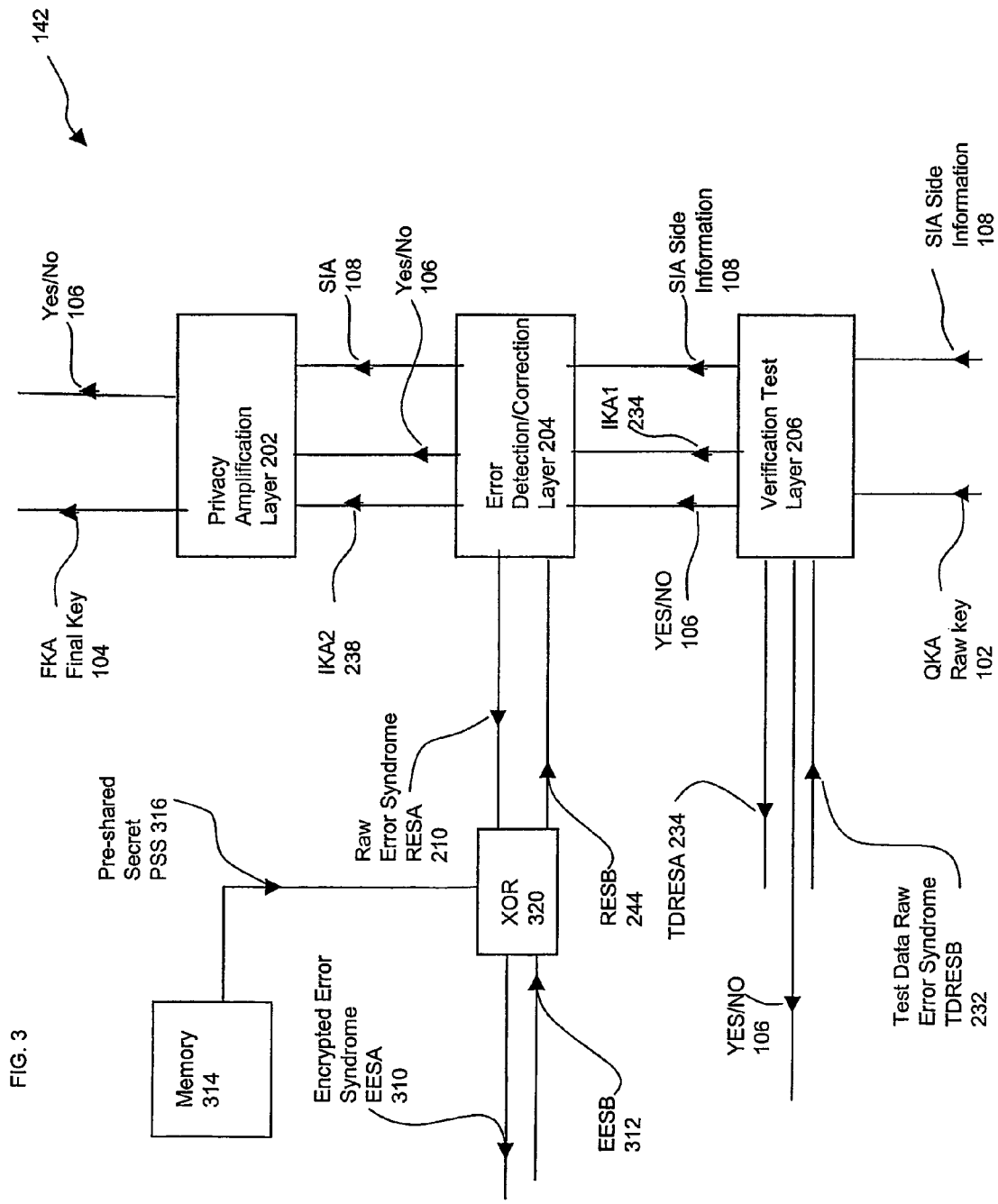
FIG. 3 is a schematic of a post processing layer 142 of a first embodiment of FIG. 2.

FIG. 3 shows Classical Post Processing Layer 142 of Alice's side of FIG. 1. Classical Post Processing Layer 142 comprises privacy amplification layer 202, error detection/correction layer 204, and verification test layer 206.

The exemplary embodiment of FIG. 3 separates classical post processing layer 142 into three consecutive layers 202, 204, 206. However, in alternative embodiments the processes of verification, error correction/detection and privacy amplification may, for example, be concurrent or intertwined in various ways. See, for example, U.S. Pat. No. 7,415,114, entitled "Quantum Key System and Method," where privacy amplification is intertwined with error correction/detection.

QKA raw key 102 and SIA side information 108 are inputs to verification test layer 206 from quantum transmission layer 144. Test data raw error syndrome TDRESB 232 is an input from Bob to verification test layer 206 from classical post processing layer 152 of channel end 122. SIA side information 108, intermediate key IKA1 234, and Yes/No signal 106 are outputs from verification test layer 206 of Alice and inputs to error detection/correction layer 204. Test data raw error syndrome TDRESA 234, and Yes/No signal 106 are outputs from verification test layer 206 and inputs to classical post processing layer 152 of channel end 122.

Intermediate Key IKA2 238, Yes/No signal 106, and side information SIA 108 are outputs from error detection/correction layer 204 and inputs to privacy amplification layer 202. Raw error syndrome RESA 210 of Alice is an output from error detection/correction layer 204 and an input to XOR 320. Encrypted error syndrome EESB 312 of Bob is an input to XOR 320 from the classical post processing layer 152 of channel end 122. Raw error syndrome 244 of Bob is an output of the XOR 320 operation and is an input to the error detection/correction layer 204.

Final key FKA 104 and Yes/No signal 106 are outputs from privacy amplification layer 202 and inputs to application layer 140.

Alice controls Memory 314 and XOR 320 and keeps their internal contents secure from an eavesdropper Eve 130. Memory 314 stores preshared secret PSS 316, shared between Alice and Bob, but kept secret from an evesdropper Eve 130. Preshared secret PSS 316 is an input to XOR 320. Encrypted error syndrome EESA 310 is an output from XOR 320 and an input to classical post processing layer 152 of channel end 122. Classical channel 132 transmits EESA 310 from Alice to Bob and EESB 312 from Bob to Alice. Raw error syndrome RESB 244 of Bob is an output from XOR 320 and an input to error detection/correction layer 204.

How Alice and Bob acquire pre-shared secret PSS 316 is not relevant to the scope of the invention. Alice and Bob may acquire PSS 316, for example, through a trusted manufacturer like MagiQ Technologies, Inc, which may put tamper-resistant memories containing PSS 316 in both Alice's and Bob's equipment. Alternatively, Alice and Bob may acquire PSS 316 by trusted couriers (perhaps through standard secret sharing technique to distribute risks). Alternatively, Alice and Bob may acquire PSS 316, for example, through the quantum key distribution (QKD) process.

Figure 4:
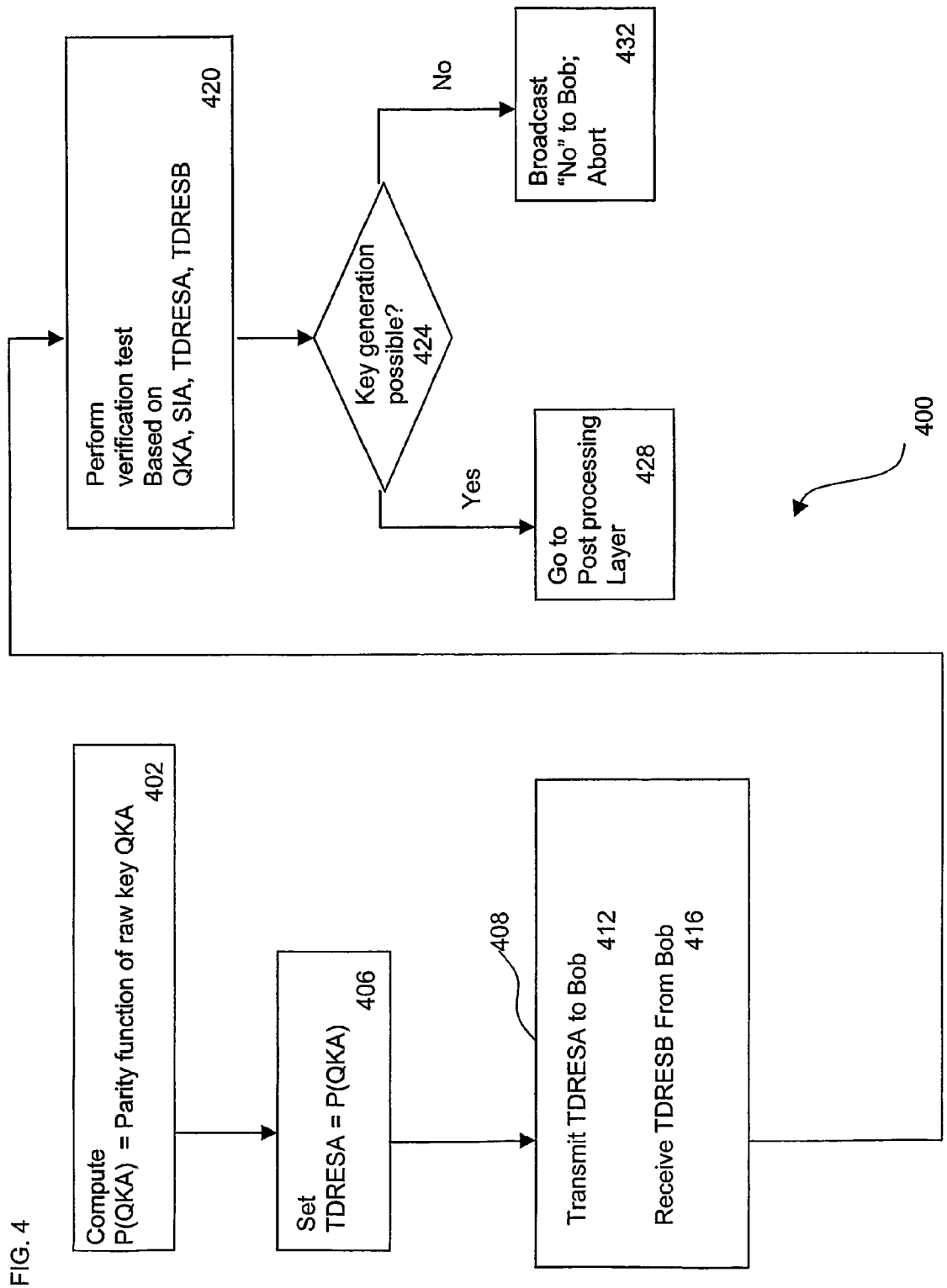
FIGS. 4-10 are flowcharts illustrating processing flows for the embodiments shown in FIGS. 1-3.

FIG. 4 is a high-level flow chart of a method 400 of the invention.

In step 402, verification test layer 206 computes parity function P(QKA) from some prescribed set of parity functions of QKA 102.

The prescribed set of parity functions may include any function P( ) that operates on at one or more bits (or information units) of a QK such that a value of P(QK) depends upon values of one or more bits (or information units) of the QK, and is operative upon QKs with the number of bits included in QKA, QKB. Preferably, P( ) is a function of only one, two, three, four, five bits (or information units) of a QK.

In step 406, verification test layer 206 sets TDRESA=P (QKA).

Step 408 comprises step 412 and step 416. Step 412 and step 416 may, for example, execute in any sequential order or concurrently or in parallel.

In step 412, verification test layer 206 communicates test data raw error syndrome TDRESA 234 to Bob at second channel end 122 via shared public classical channel 132.

In step 416, verification test layer 206 receives test data raw error syndrome TDRESB 232 from Bob at second channel end 122 via shared public classical channel 132. Bob's verification test layer computes TDRESB 232 from QKB using the same algorithm used by Alice's verification test layer 206.

In step 420, verification test layer 206 performs a verification test based on QKA 102, SIA 108, TDRESA 234, and TDRESB 232.

In step 424, verification test layer 206 decides whether key generation can be successful.

In step 428, verification test layer 206 communicates a Yes signal to Bob via channel 132 and transfers execution to error detection/correction layer 204. Both Alice and Bob proceed to the error detection/correction stage of respective post processing layers 142, 152.

In step 432, verification test layer 206 communicates a No signal to Bob via channel 132 and aborts QK processing. The key generation process of classical post processing layers 142, 152 can be terminated.

Figure 5:
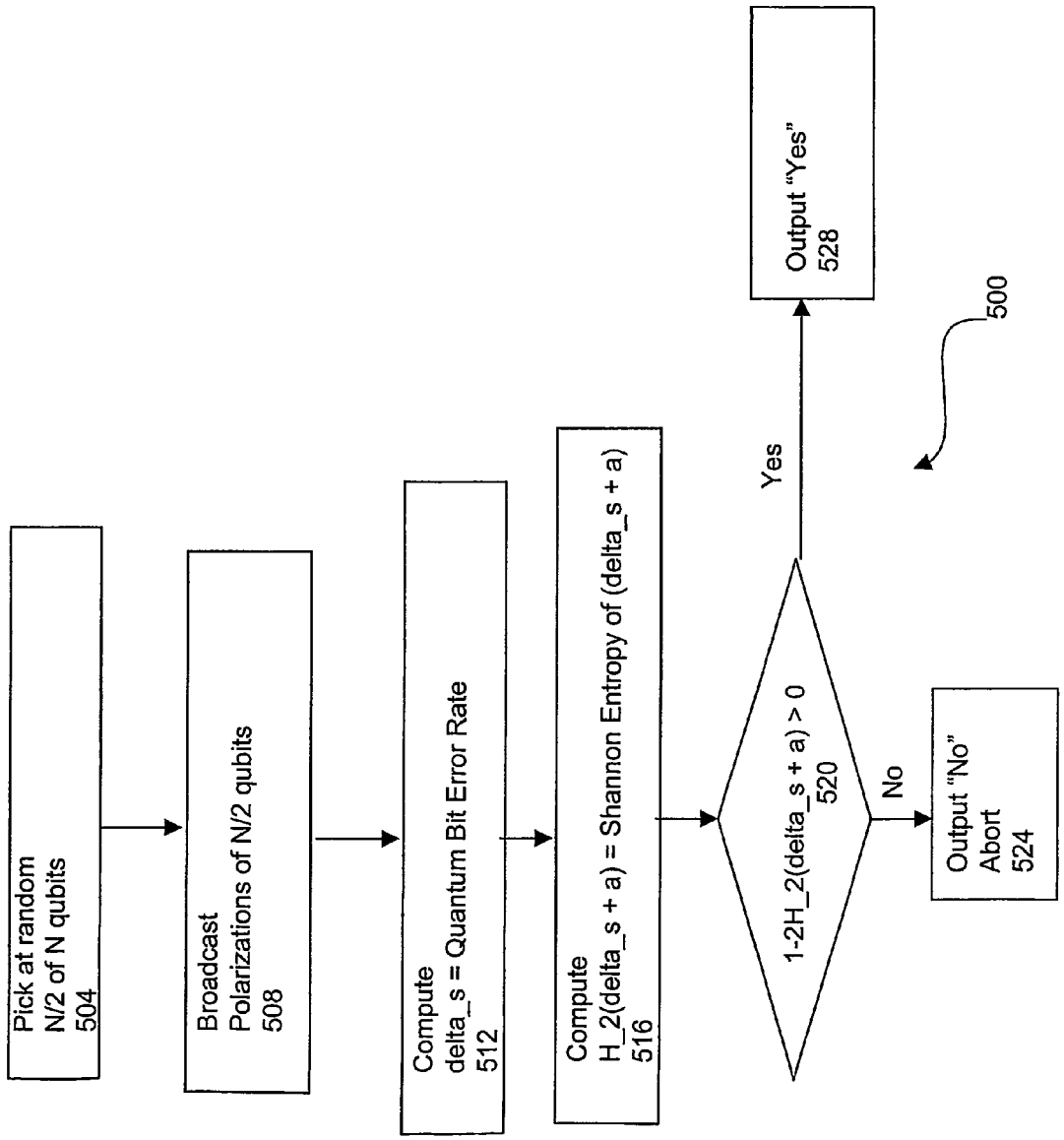

FIG. 5 is a mid-level flow chart 500 showing an expanded view of an exemplary verification test step 420 of FIG. 4.

In step 504, N quantum bits (qubits) are transmitted by Alice and received by Bob in the same basis in the Bennett and Brassard protocol (BB84).

In step 508, Alice randomly picks a portion, say half of the N qubits and communicates their polarizations to Bob. Bob communicates his polarizations for those N/2 signals to Alice.

In step 512, from the tested sample, Alice and Bob compute the quantum bit error rate, delta_s, in the qubit transmission. In this example, the prescribed parity functions P( ) referred to above are simply the bit values of a subset of N/2 qubits.

In step 520, if $1 - 2H\_2(\text{delta\_s} + a) = < 0$, processing goes to step 524; else processing goes to step 528.

In step 524, Alice and Bob output "No" and abort the key generation process.

In step 528, Alice and Bob output "Yes" for the verification test result.

The function, $H\_2(x) = -x \log\_2 x - (1-x) \log\_2 (1-x)$ is the usual Shannon entropy of a binary distribution with probabilities, x and 1−x, respectively. Refer to standard textbooks in information theory for a more detailed discussion of $H\_2(x)$.

The constant "a" is a prescribed positive constant, whose choice may depend on the value of N from classical random sampling theory. Discussion on the value of "a" can be found, for example, in Shor et al "Simple proof of security of the BB84 quantum key distribution scheme," Phys. Rev. Lett. Vol. 85, no. 2, pp. 441-444, July 2000, in Gottesman et al., "Secure quantum key distribution using squeezed states," published on Sep. 25, 2000, on the Cornell University Library's ArXiv website under the section "quantum physics" as publication number 0008/0008046, and particularly, in Lo, Chau, and Ardehali (Lo et al., "Efficient quantum key distribution scheme and proof of its unconditional security," published on Nov. 30, 2001, on the Cornell University Library's ArXiv website under the section "quantum physics" as publication number 011/00110566 (including, version 2, p. 24, Lemma 1), the entire contents of which are incorporated herein by reference.

Methods of the invention can be combined, for example, with refined data analysis techniques discussed in Lo, Chau, and Ardehali and also in Lo et al, U.S. Pat. No. 5,732,139.

Alternative verification tests can be used in conjunction with the invention. For example, instead of sacrificing the data generated by a random subset by communicating them during the verification test, Alice and Bob may estimate the error rate of the transmission by simply picking a standard classical error correcting code and performing classical error correction. Afterwards, they can verify that all errors have, indeed, been corrected by performing a standard random hashing technique. If all errors have been corrected, then the data will pass r rounds of random hashing with certainty. On the other hand, if some errors have not been corrected, the data will pass r rounds of random hashing with a probability only $2^{\{-r\}}$ (two to the power -r), which is exponentially small in r. See, for example, Bennett et al., "Mixed-state entanglement and quantum error correction," Phys. Rev. A, vol. 54, no. 5, pp. 3824-3851, November 1996, the entire contents of which is incorporated herein by reference, for a discussion of the random hashing technique in a different context.

The polarization of the untested sample of Alice will now be used as IKA1 234. (Similarly, for Bob, IKB1.)

The outputs of Alice will include intermediate key IKA1 234 of the first stage, as well as SIA 108.

Figure 6:
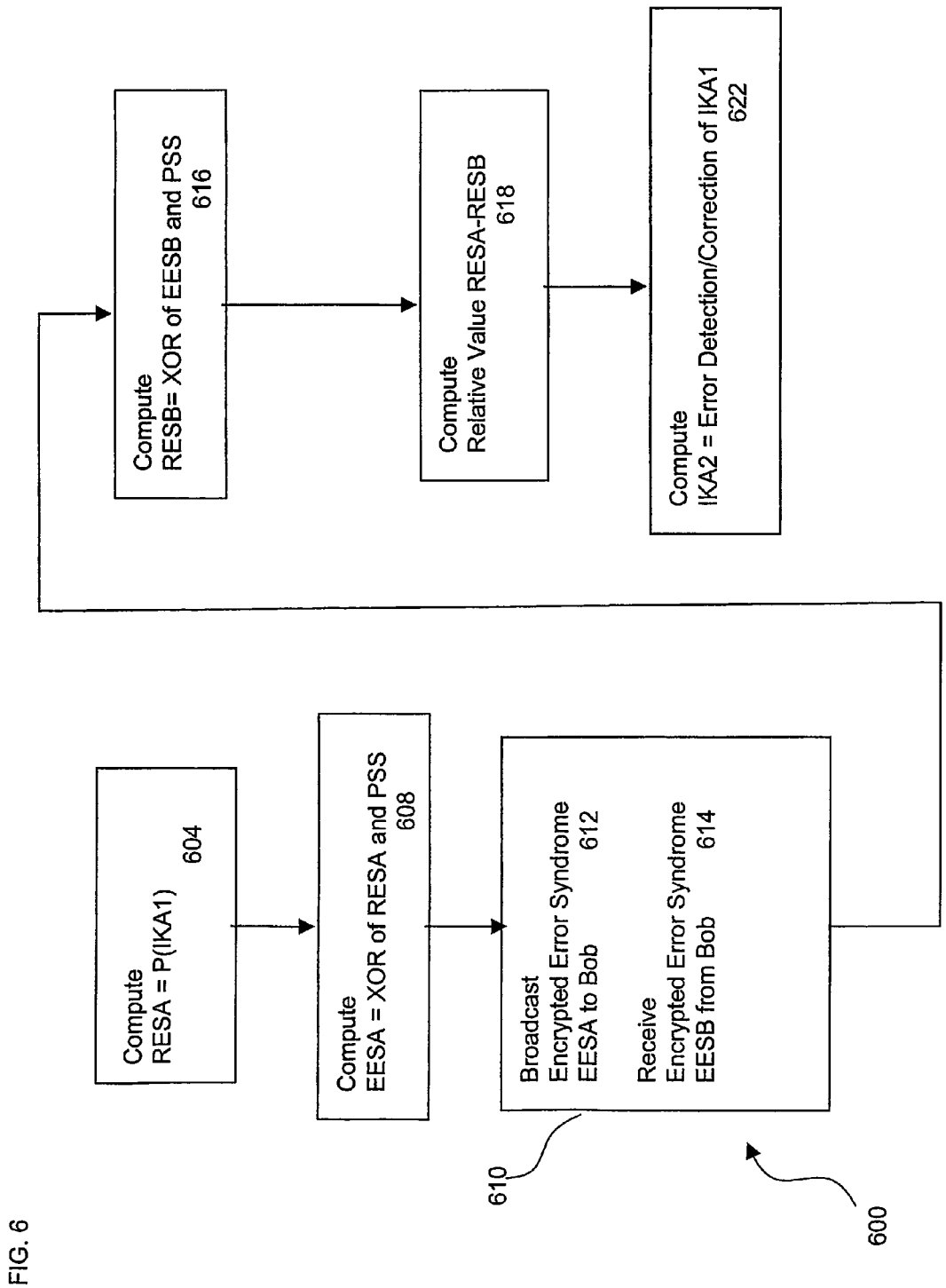

FIG. 6 is a high-level flow chart of a method 600 of the invention.

In step 604, Alice's error detection/correction layer 204 computes some prescribed parity functions, P( ), of IKA1 234 as raw error syndrome RESA 210.

An advantageous feature of the invention is the following. Alice shares a pre-shared secret (PSS 316) with Bob. PSS 316 comprises, for example, a binary string.

In step 608, instead of communicating her raw error syndrome RESA 210 to Bob, Alice computes the bitwise exclusive-or (XOR) of PSS 316 and RESA 210 to obtain the encrypted error syndrome EESA 310.

Step 610 comprises step 612 and step 614. Step 612 and step 614 may, for example, execute in any sequential order or concurrently or in parallel.

In step 612, Alice communicates EESA 310 to Bob. That is, a so-called one-time-pad encryption is performed on the raw error syndrome RESA 210 before its transmission to Bob.

RESB 244 is the outcome of the same prescribed parity functions P( ) when Bob applies P( ) to IKB1. Similarly, instead of communicating his raw error syndrome, RESB 244, to Alice, Bob computes the XOR of PSS 316 and RESB 244 to obtain the encrypted error syndrome, EESB 312, and communicates EESB 312 to Alice via channel 132.

In step 614, Alice receives EESB 312 from Bob.

In step 616, Alice computes the exclusive-or (XOR) of PSS 316 and EESB 312 to obtain Bob's decrypted raw error syndrome RESB 244 from EESB 312.

In step 618, Alice computes the relative value RESA-RESB as the bit-wise modulo 2 subtraction of the string RESB 244 from the string RESA 210. Recall that RESA 210 and RESB 244 both comprise binary strings. In alternative embodiments of the invention subtraction may, for example, be on a general finite field. See standard text-books on finite field theory, including the introductory chapter of MacWilliams and Sloane, "The Theory of Error-correcting Codes," the entire contents of which is incorporated herein by reference.

In step 622, using the relative value RESB-RESA, Alice performs error detection/correction on IKA1 234 and obtains IKA2 238, the intermediate key of the second stage for Alice, as the output. Similarly, using RESB-RESA, Bob performs error detection/correction on IKB1 and obtains IKB2 as the output.

In alternative embodiments of the invention shown in FIG. 600, steps 608, 610, 616, and 618 may, for example, execute out of sequential order or concurrently or in parallel. In other embodiments of the invention shown in FIG. 600, an adaptive and/or iterative process, for example, may determine alternative error syndromes to compute and communicate in steps 608, 610, 616, or 618.

Figure 7:
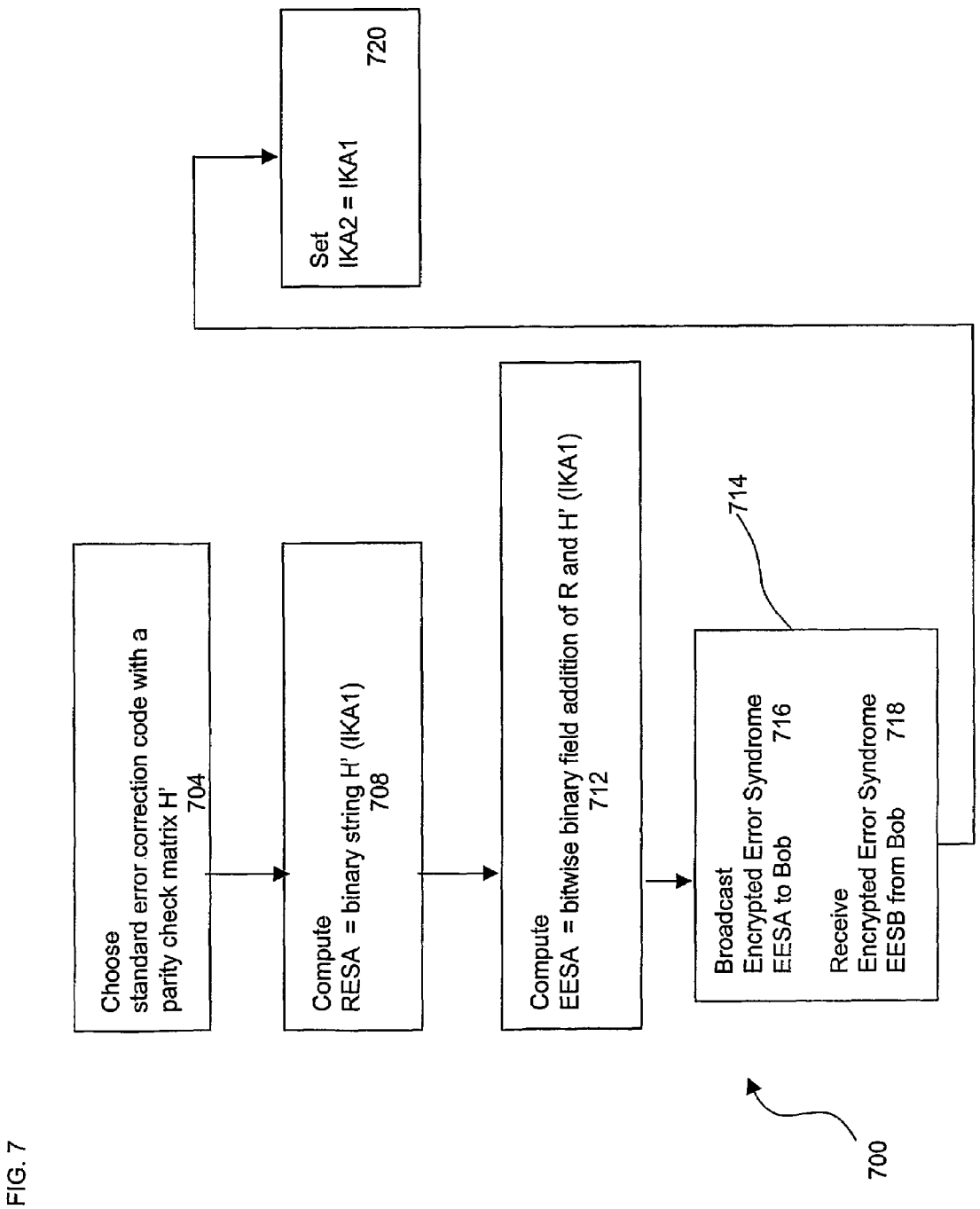

FIG. 7 is a mid-level flow chart 700 showing an expanded view of an exemplary error detection/correction step 622 of FIG. 6.

Let N' be the length of the intermediate key IKA2 238.

In step 704, Alice and Bob choose a standard error correction code with a parity check matrix H', which with a high probability, can correct a fraction of up to t errors (i.e., tN' out of N' locations where t=delta_s+a) in the quantum transmission. See standard textbooks such as MacWilliams and Sloane, "The Theory of Error-correcting Codes," the entire contents of which is incorporated herein by reference, for a discussion of the theory of error correcting codes.

Suppose PSS 316 is a binary string R=($R_1$, $R_2$, ... $R_k$).

In step 708, Alice computes raw error syndrome, RESA 210 as the binary string H' (IKA1). Similarly, Bob computes raw error syndrome, RESB 244 as the binary string H' (IKB1).

In step 712, Alice computes encrypted error syndrome EESA 310 as the bitwise binary field addition of R and H' (IKA1) by matrix multiplication, whereas Bob computes EESB 312 as the bitwise binary field addition of R and H' (IKB1) by matrix multiplication.

Step 714 comprises step 716 and step 718. Step 716 and step 718 may, for example, execute in any sequential order or concurrently or in parallel.

In step 716, Alice communicates EESA to Bob through classical channel 132. Bob communicates EESB to Alice through classical channel 132.

In step 718, Alice receives EESB from Bob through classical channel 132.

Since the values of EESA 310 and EESB 312 may be communicated via a public channel, any eavesdropper (such as Eve 130) can compute the relative value EESB 312-EESA 310, by bitwise binary subtraction. Note that this relative value is the same as RESB 244-RESA 210.

Using this relative value as the effective error syndrome in the transmission, Bob performs standard error correction on his string IKB1 to obtain a new string IKB2. Ideally, IKB2 is the same as IKA1, which is the string held by Alice before entering the error detection/correction layer 204.

In step 720, Alice now simply sets IKA2 238 to be IKA1 234.

In summary, in the preferred embodiment of the invention, IKA2 238 is a completely random string (rather than a codeword in some non-trivial classical error correction code), generated directly from the quantum transmission. Therefore, IKA2 238 has the same length as IKA1 234. In contrast, in standard Shor-Preskill's proof (Shor et al "Simple proof of security of the BB84 quantum key distribution scheme", Phys. Rev. Lett. Vol. 85, no. 2, pp. 441-444, July 2000), IKA2 238 is restricted to be a codeword in a classical error correcting code. Therefore, IKA 238 is effectively much shorter than IKA1 234 in Shor-Preskill's result.

In an alternative embodiment of the invention, Alice and Bob use the Cascade protocol for error correction to generate RESA 210 and RESB 244, as presented in Brassard et al., "Secret Key Reconciliation by Public Discussion, Advances in Cryptology," Eurocrypt '93 Proceedings, pp. 410-423, 1993, or its variants (e.g., Sugimoto et al., "A study on Secret Key Reconciliation Protocol "Cascade,"IEICE Trans. Fundamentals E83-A, pp. 1987-1991, January 2000), the entire contents of which are incorporated herein by reference. The invention allows Alice and Bob to use the same PSS to encode these two RESA 210 and RESB 244 to generate EESA 310 and EESB 312 respectively, in such a way that, EESB 312-EESA 310 is the same as RESB 244 and RESA 210. As before, Alice communicates EESA 310 and Bob communicates EESB 312.

A feature of the invention is the same pre-shared secret, PSS, is used for the encryption of RESA and RESB. Naively, one might have thought that different secrets, PSS1 and PSS2, should be used to encrypt the two strings, RESA and RESB, to ensure security. An important observation is that this is actually unnecessary in the invention.

Another feature of the invention is that the invention works not only for methods of error correction involving one-way classical communication (for instance, from Alice to Bob only), but also methods of error correction involving two-way classical communications. An example of such a two-way classical communications method is the well-known Cascade protocol. The present invention provides a provably secure method of using the Cascade protocol to provide unconditional security against the most general attack. See, for example, "Method for Decoupling Error Correction from Privacy Amplification," a copy of which is submitted herewith as appendix 1 and the entire contents of which is incorporated herein by reference.

Another feature of the invention is that the method of the invention works not only for methods of error correction, but also methods of error detection. For example, the invention can be used in conjunction with the pending patent application by the present inventor and Daniel Gottesman "Quantum Key System and Method," (attorney docket no. MAGI0013U/PCT).

Figure 8:
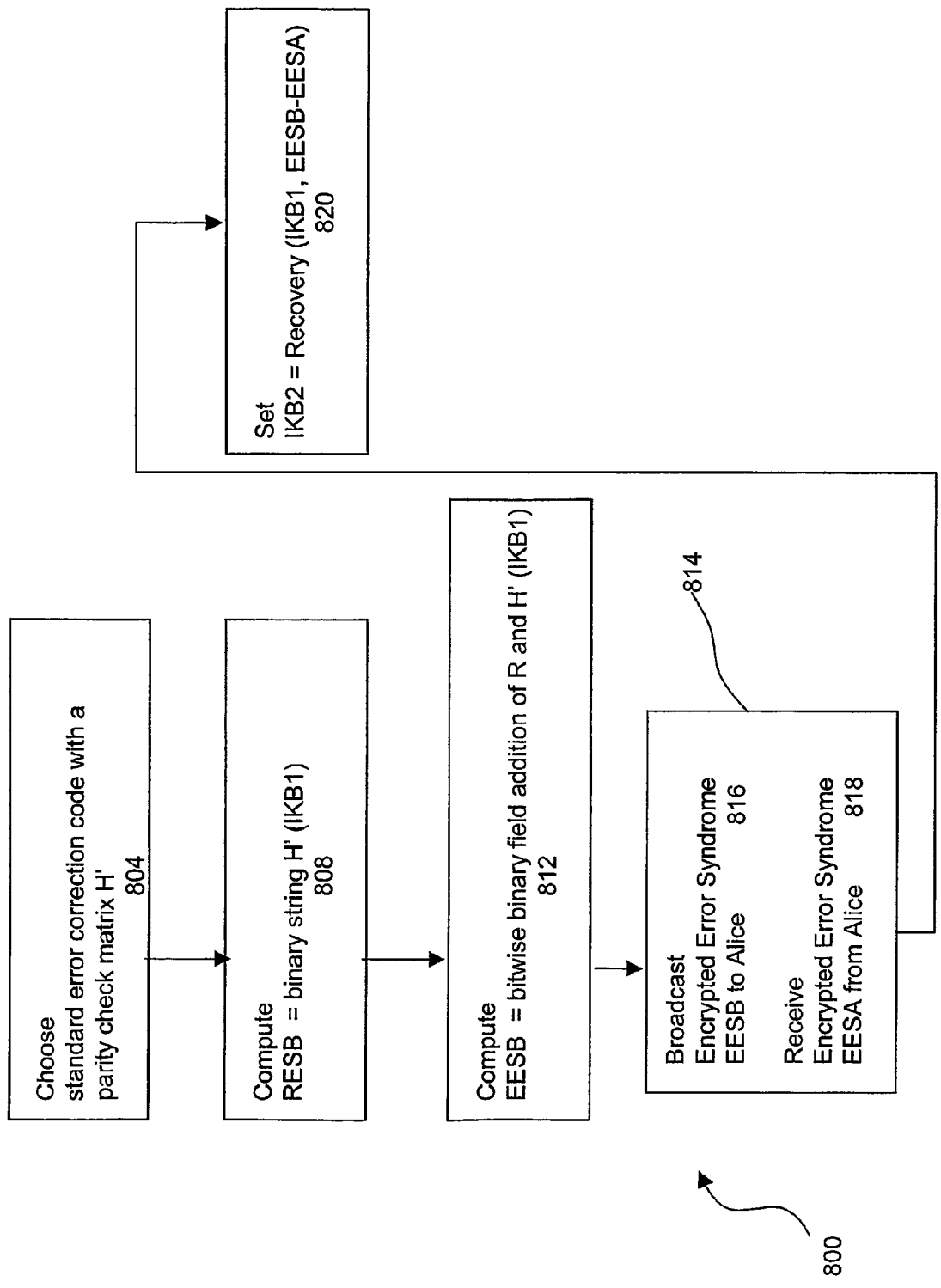

FIG. 8 is a mid-level flow chart 800 showing an exemplary error detection/correction method of the invention that may be executed by Bob.

In step 804, Bob and Alice choose a standard error correction code with a parity check matrix H', which with a high probability, can correct a fraction of up to t errors (i.e., tN' out of N' locations where t=delta_s+a) in the quantum transmission.

In step 808, Bob computes raw error syndrome, RESB 244 as the binary string H' (IKB1).

In step 812, Bob computes EESB 312 as the bitwise binary field addition of R and H' (IKB1) by matrix multiplication.

Step 814 comprises step 816 and step 818. Step 816 and step 818 may, for example, execute in any sequential order or concurrently or in parallel.

In step 816, Bob communicates EESB to Alice through classical channel 132.

In step 818, Bob receives EESA from Alice through classical channel 132.

In step 820, Bob applies a recovery operator on the two variables (IKB1, EESB-EESA) to obtain a new string IKB2. The recovery operation in the preferred embodiment is the standard decoding method of a linear code with an error syndrome EESB-EESA. Such standard decoding method is discussed in standard textbooks in classical coding theory including MacWilliams and Sloane.

Figure 9:
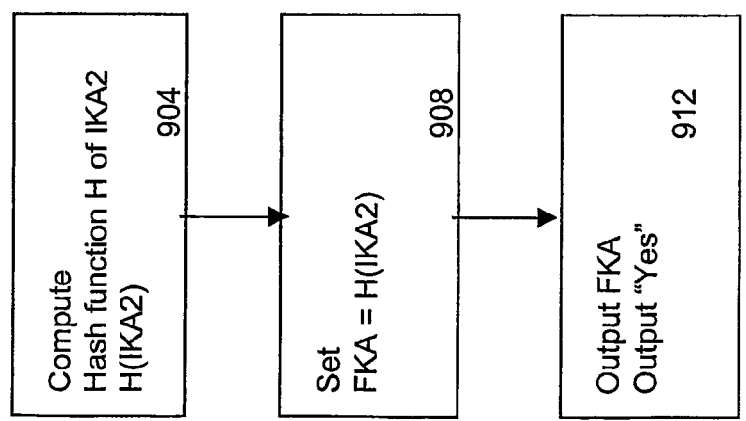
Figure 9:
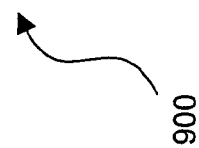

FIG. 9 is a high-level flow chart of a method 900 of the invention.

In step 904, Aice's privacy amplification layer 202 applies some prescribed hash function, H, to IKA2 238.

In step 908, Alice obtains the final key FKA 104=H(IK2A 238). Similarly, Bob applies the same hash function, H, to IKB2 to obtain the final key FKB=H(IKB2). Privacy amplification layer 202 ensures that (1) either the data (QKA,SIA, QKB,SIB) will fail the verification test with almost certainty, or an eavesdropper Eve 130 will have a negligible amount of information on the final key FKA, and (2) FKA=FKB with high probability and FKA is essentially random.

In step 912, the output of the Alice's classical post processing layer 142 as a whole is a one-bit yes/no signal 106 and the final key FKA 104.

Figure 10:
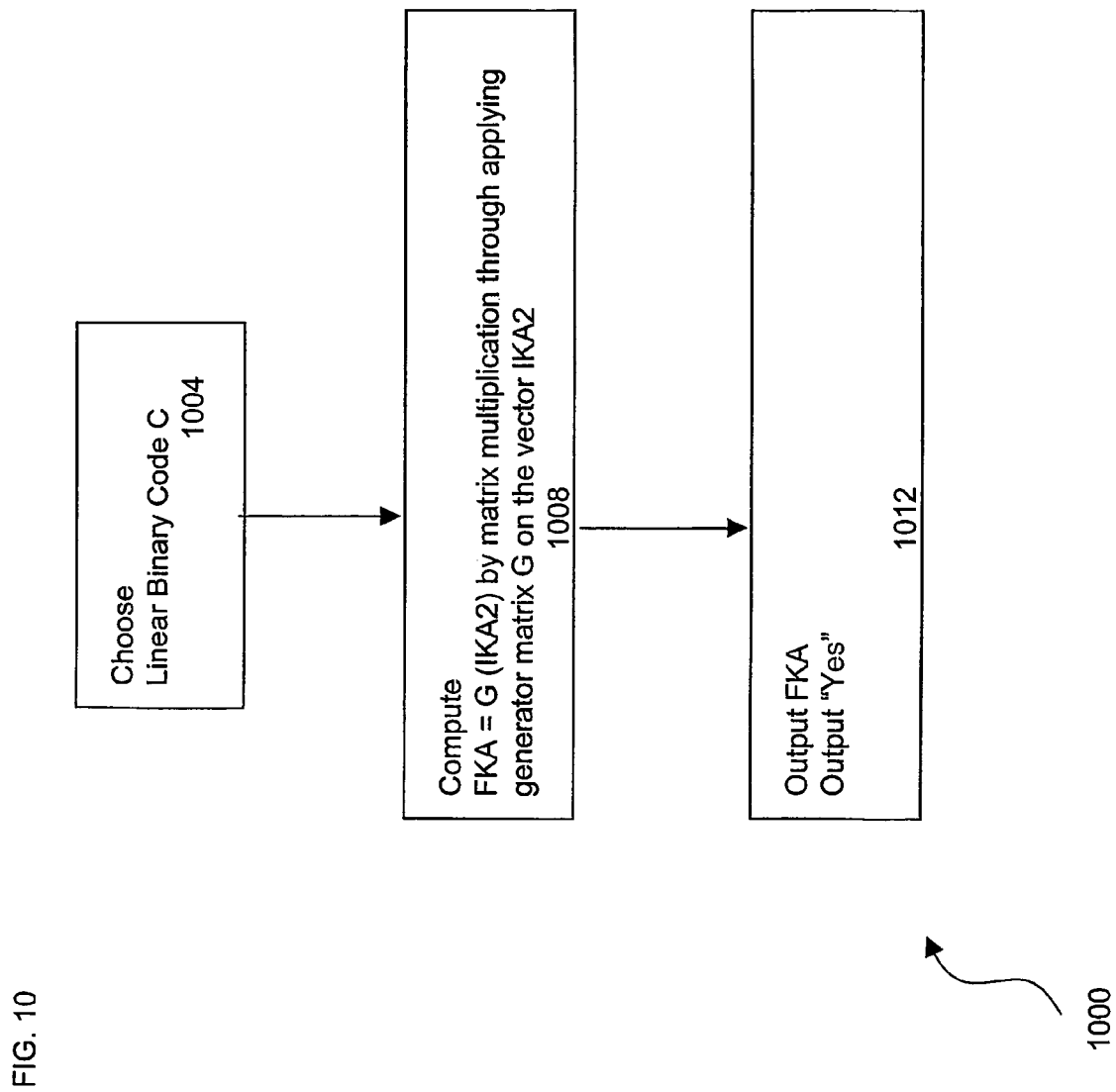

FIG. 10 is a high-level flow chart of an example privacy amplification method 1000 of the invention.

In step 1004, a linear binary code, C, that can correct with a high probability up to tN' errors in N' positions is chosen. For example, t=delta_s+a in BB84. Let G be the generator matrix of C.

In step 1008, Alice computes the final key, FKA=G (IKA2) by matrix multiplication through applying the generator matrix on the vector IKA2. Similarly, Bob computes the final key, FKB=G(IKB2). See standard textbooks on error correcting codes such as MacWilliams and Sloane for notation. See, also, Shor-Preskill's proof (Shor et al "Simple proof of security of the BB84 quantum key distribution scheme," Phys. Rev. Lett. Vol. 85, no. 2, pp. 441-444, July 2000), for the application of those ideas in the context of privacy amplification. See also, Wei, "Generalized Hamming Weights for Linear Codes," which is incorporated herein by reference, for a discussion on a related subject.

In step 1012, Alice outputs FKA and outputs "Yes." Similarly, Bob outputs FKB and outputs "Yes."

Note that Alice can use all or part of the generated key FKA to refurnish the PSS in her memory. Similarly, Bob can use all or part of the generated key FKB to refurnish the PSS in his memory.

The invention allows any linear binary code, C, that can correct, with high probability, a fraction t of errors to be used. In contrast, in the result by Shor-Preskill, the code, C, must satisfy some special property, namely, the dual of C, C^/perp, must be a subcode of another C__1, which can correct also a fraction t of errors. Application of Shor-Preskill result generally requires the users to (1) find both C__1 and C, and (2) use the code C__1 for the error correction step. The invention does not require the users to find such a C__1 at all. This is an advantageous feature of the invention.

One example of a set of linear codes that will correct, with high probability, a fraction t of errors, is the set of random linear codes whose generator matrix has binary entries that can be chosen randomly. Therefore, it is simple to generate such a random matrix, for example, using a physical random number generator. Such a random matrix approach can be used, for example, in the privacy amplification layer 202 and, more concretely, steps 1004 and 1006.

Note that our invention offers competitive key generation rates. Indeed, for BB84, with only one-way classical communications, our invention can tolerate the same bit error rate of about 11%, as in the standard Shor-Preskill result. More concretely, in the case of BB84, suppose 2N photons are transmitted and received by Alice and Bob in the same bases. Alice and Bob can randomly pick N of the 2N photons for the verification test. Let delta_s be the bit error rate found in the verification test. Suppose Alice and Bob share a pre-shared secret (PSS 316) of length about N(H__2(delta_s+a)). Then, Alice and Bob can pick a standard error correcting code that can correct errors with high probability. Alice and Bob each compute the raw error syndrome RESA 210 and RESB 244, respectively. Each of Alice and Bob then uses PSS 316 to perform one time pad encryption to obtain EESA 310 and EESB 312 respectively. Alice communicates EESA 310 to Bob and Bob communicates EESB 312 to Alice. Bob can perform error correction using the relative value EESB-EESA. For privacy amplification, Alice and Bob can, for example, use a random matrix to generate a random FKA 104 of length N(1−H__2(delta_s+a)).

In summary, the process as a whole consumes a PPS 316 of length N(H__2(delta_s+a)) and generates a secure key of length N(1−H__2(delta_s+a)). Therefore, the net key generation rate is N(1−2H__2(delta_s+a)) which is positive, provided that the error rate is less than about 11 percent.

Note that the invention can be combined with standard protocols such as the Cascade protocol. In alternative embodiments of the invention, a Cascade protocol may be used for the error detection/correction layer 204.

Note that in alternative embodiments the invention can be combined with protocols involving two-way classical communications studied in Gottesman-Lo (Gottesman, et al., "Proof of security of quantum key distribution with two-way classical communications," published on May 23, 2001, at Cornell University Library's ArXiv website under the heading "quantum physics" as publication number 0105/0105121, the entire contents of which is incorporated herein by reference). In an alternative embodiment of the invention, Alice and Bob first perform error detection using the two-way subroutines described in Gottesman-Lo. No one time pad encryption of error syndrome is performed in this first stage. In the second stage, Alice and Bob perform error correction using the Cascade protocol. One-time-pad encryption of error syndrome is performed in this second stage. In the third stage, Alice and Bob perform privacy amplification using a random generator matrix. More details of this alternative embodiment can be found in Appendix I attached herewith.

Embodiments of the invention may be applied, for example, to real-life imperfect devices. Security models for real-life devices have been discussed in, for example, Inamori et al., "Unconditional Security of Practical Quantum Key Distribution," published on Jul. 3, 2001, on Cornell University Library's ArXiv website under the section "quantum physics" as publication number 0107/0107017 pp. 1-47, and Gottesman-Lo-Lutkenhaus-Preskill as published on Cornell University Library's ArXiv website under the section "quantum physics" as publication number 021206-6, which are both incorporated herein by reference. For example, in Gottesman-Lo-Lutkenhaus-Preskill, two types of error rates, bit-flip and phase, are defined. These two types of error rates tell Alice and Bob the amounts of error correction and privacy amplification respectively required for achieving security.

The invention can be used to achieve security that is clearly and rigorously defined within a theoretical security model. For example, embodiments of the invention can be used to achieve the so-called unconditional security of QKD, i.e., to say security against the most general type of eavesdropping attacks. With more relaxed security assumptions, the invention can also achieve security against more restricted types of attacks, such as individual attacks. See, for example, Scarani et al, as published on Cornell University Library's ArXiv website under the section "quantum physics" as publication number 0211131 for a discussion of more restricted attacks. An advantage of such relaxed assumptions may be a higher key generation rate or a more efficient implementation.

Besides BB84, embodiments of the invention can be applied to other quantum key distribution schemes. An example is the six-state scheme. As discussed in Lo, "Proof of unconditional security of six-state quantum key distribution scheme," Quantum Information and Computation, vol. 1, No. 2, pp. 81-94, 2001, at the same bit error rate, the six-state scheme offers a higher key generation rate. This is due to the correlations between the bit-flip and phase errors in the six-state scheme in the entanglement purification language. Embodiments of the invention can be combined with the discussion in Lo, "Proof of unconditional security of six-state quantum key distribution scheme," Quantum Information and Computation, vol. 1, No. 2, pp. 81-94, 2001. Embodiments of the invention can also be combined with efficient QKD schemes discussed in Lo, Chau and Ardehali.

The invention can advantageously offer competitive final key generation rates and be implemented with limited computational power.

While the invention is described herein with reference to illustrative embodiments for particular applications, it should be understood that the invention is not limited thereto and is defined with respect to the appended claims.

What is claimed is:

1. A system for distributing cryptographic key information, comprising:
   a first computer system;
   a second computer system; and
   a communications link linking said first computer system and said second computer system;
   wherein said first computer system is structured:
   (a) to determine a first generalized error syndrome of a quantum transmission between said first computer system and said second computer system;
   (b) to encrypt said first generalized error syndrome using a sequence of values to form a first encrypted generalized error syndrome; and
   (c) to communicate said first encrypted generalized error syndrome to said second computer system.

2. The system of claim 1, wherein said second computer system is structured:
   (a) to determine a second generalized error syndrome of said quantum transmission between said first computer system and said second computer system;
   (b) to encrypt said second generalized error syndrome using said sequence of values to form a second encrypted generalized error syndrome; and
   (c) to communicate said second encrypted generalized error syndrome to said first computer system.

3. The system of claim 2, wherein said first computer system is further structured to receive from said second computer system said second encrypted generalized error syndrome of said quantum transmission.

4. The system of claim 3, wherein said second computer system is further structured to receive from said first computer system said first encrypted generalized error syndrome of said quantum transmission.

5. The system of claim 4, wherein said first computer system and said second computer system are structured to compute respectively said first generalized error syndrome and said second generalized error syndrome using at least one parity function.

6. The system of claim 2, wherein said second computer system is structured to encrypt using one time pad encryption.

7. The system of claim 2, wherein said first computer system is structured to compute a relative value from said first encrypted generalized error syndrome and said second encrypted generalized error syndrome and second computer system is structured to compute said relative value.

8. The system of claim 2, wherein said first computer system is structured to compute a function of said first encrypted generalized error syndrome and said second encrypted generalized error syndrome and wherein said second computer system is structured to compute said function.

9. The system of claim 1, wherein said first computer system is structured to encrypt using one time pad encryption.

10. The system of claim 1, wherein said sequence of values is stored in said first computer system and said second computer system.

11. The system of claim 1, wherein said first computer system and said second computer system are structured to transmit a quantum key and receive a quantum key.

12. The system of claim 1, wherein said second computer system is structured:
   (a) to determine a second generalized error syndrome of said quantum transmission between said first computer system and said second computer system;
   (b) to encrypt said second generalized error syndrome using said sequence of values to form a second encrypted generalized error syndrome; and
   (c) to compute a prescribed joint function of said first encrypted generalized error syndrome and said second encrypted generalized error syndrome.

13. A computer implemented method for distributing cryptographic key information, comprising:
   (a) determining by a first computer system a first generalized error syndrome of a quantum transmission between said first computer system and a second computer system;
   (b) encrypting by said first computer system said first generalized error syndrome using a sequence of values to form a first encrypted generalized error syndrome; and
   (c) communicating from said first computer system said first encrypted generalized error syndrome to said second computer system.

14. The method of claim 13, further comprising:
   (a) determining by said second computer system said second generalized error syndrome of a quantum transmission between said first computer system and said second computer system;

(b) encrypting by said second computer system said second generalized error syndrome using a sequence of values to form a second encrypted generalized error syndrome; and (c) communicating from said second computer system said second encrypted generalized error syndrome to said first computer system.

15. The method of claim 14, wherein said step (a) comprises using at least one parity function.

16. The method of claim 14, wherein said step of encrypting comprises using one time pad encryption.

17. The method of claim 14, wherein said step of encrypting comprises bitwise exclusive-or-ing (XOR-ing) said second generalized error syndrome with said sequence of values.

18. The method of claim 13, further comprising:
(d) receiving from said second computer system by said first computer system a second encrypted generalized error syndrome of said quantum transmission.

19. The method of claim 18, further comprising:
computing by said first computer system a relative value from said first encrypted generalized error syndrome and said second encrypted generalized error syndrome.

20. The method of claim 19, wherein said step of computing said relative value comprises bit-wise modulo 2 subtraction of said first encrypted generalized error syndrome from said second encrypted generalized error syndrome.

21. The method of claim 18, including executing at least two of said steps (a)-(d) substantially in parallel.

22. The method of claim 18, wherein said step of encrypting comprises using one time pad encryption.

23. The method of claim 13, wherein said step of encrypting comprises using one time pad encryption.

24. The method of claim 13, wherein said step of encrypting comprises bitwise exclusive-or-ing (XOR-ing) said first generalized error syndrome with said sequence of values.

25. The method of claim 13, including executing at least two of said steps (a)-(c) substantially in parallel.

26. The method of claim 13, comprising storing said sequence of values in said first computer system and said second computer system.

27. A method for secure communications comprising:
(a) transmitting a quantum transmission from a first transmitter to a second receiver, said quantum transmission encoded with quantum key information at said first transmitter defining a first sequence of values;
(b) receiving at said second receiver said quantum transmission and determining a second sequence of values from said quantum transmission;
(c) determining a first generalized error syndrome associated with said first sequence of values;
(d) encrypting said first generalized error syndrome using one time pad encryption to define an encrypted first generalized error syndrome; (e) determining a second generalized error syndrome associated with said second sequence of values; and
(e) encrypting said second generalized error syndrome using one time pad encryption to define an encrypted second generalized error syndrome.

28. The method of claim 27 wherein said encrypting said first generalized error syndrome is based upon an encryption key and said encrypting said second generalized error syndrome is based upon said encryption key.

29. The method of claim 27 further comprising transmitting said encrypted first generalized error syndrome to said second receiver.

30. The method of claim 27 further comprising transmitting from a second transmitter associated with said second receiver said encrypted second generalized error syndrome to a first receiver associated with said first transmitter.

31. The method of claim 27 further comprising:
decrypting said first generalized error syndrome; and
decrypting said second generalized error syndrome.

32. The method of claim 27 further comprising:
determining the key by decrypting said encrypted first generalized error syndrome; and
determining said key by decrypting said encrypted second generalized error syndrome.

33. A system for distributing cryptographic key information comprising: a first computer system;
a second computer system; and a communications link linking said first computer system and said second computer system;
wherein a string of numbers is stored in both the first computer system and the second computer system, and wherein said first computer system is structured:
(a) to determine a first generalized error syndrome of a quantum transmission between said first computer system and said second computer system;
(b) to encrypt said first generalized error syndrome using part of said string of numbers to form a first encrypted generalized error syndrome;
(c) to communicate said first encrypted generalized error syndrome to said second computer system;
(d) to receive a second generalized error syndrome from said second computer system; and
(e) to decrypt said second generalized error syndrome using the same part of said string of numbers to form a second unencrypted generalized error syndrome.

* * * * *